Patented Apr. 8, 1930

1,754,071

UNITED STATES PATENT OFFICE

CHARLES L. WAID, OF PALMER, MASSACHUSETTS

HOOK

Application filed June 5, 1928. Serial No. 283,070.

This invention relates to improvements in hooks and the principal object thereof is the provision of a hook which is not only simple in construction so as to be economical to manufacture, but which is rigid in its construction.

The invention in the form at present preferred will be described in connection with the accompanying drawings, in which—

Figure 1:
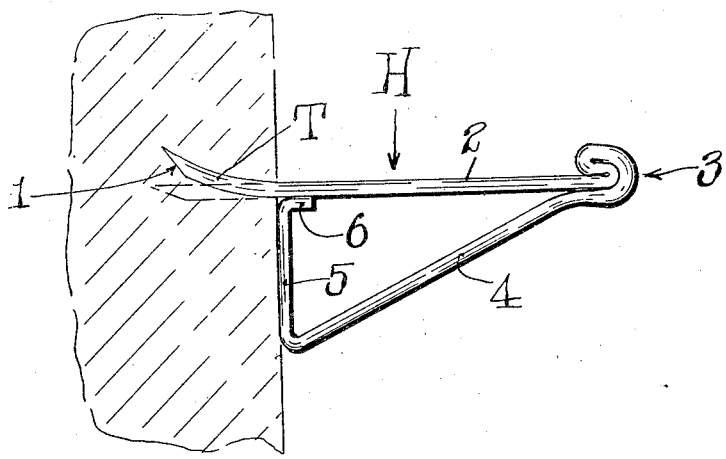
Figure 2:
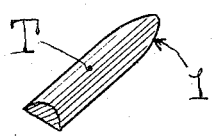

Fig. 1 is a side elevational view of the hook of my invention as it appears when driven into a wall or the like and Fig. 2 is a perspective view showing the pointed end of the hook.

Referring to the drawings, in detail, the invention will now be described.

The hook H is preferably formed from a single length of material such as wire and for best results a half-round wire is employed as it lends itself readily to the forming operation, provides the desired stiffness and rigidity and as distinguished from a round wire will not turn when the hook is driven into a wall. The forward end of the length of wire is sharpened by beveling the lower side thereof as at 1 to provide a suitably pointed tine T extending forwardly of a shank portion 2. The said length of material is doubled upon itself intermediate its ends to form a driving head 3 composed as is shown of superposed or overlapped layers disposed at the rear end of the shank 2. The other end 4 of the length of material extending from the head is bent angularly with respect to the shank portion and has its end 5 bent towards the shank with the extremity 6 thereof bent substantially in parallelism with the shank and in contact therewith, as shown.

The portions 4, 5, and 6 in the form shown, provide a brace or strut for the shank and reinforce it against bending when the hook is driven into a wall or the like for supporting a weight. The extremity 6 of the brace may, if desired, be rigidly secured to the shank by welding or in any other suitable manner in order to provide a rigid substantial structure.

The tine T of the hook is made so as to be in alignment with the shank 2 as is shown in dotted lines as Fig. 1, the lower side of the tine at the forward end thereof being bevelled as described to provide the sharpened point.

In using the hook the tine T, as with a spike, is driven into a wall or other support by striking the head 3 with a suitable implement. As the point of the tine enters the wall by reason of the bevel at the lower side it is curved upwardly to some extent depending upon the degree of bevelling as is shown in Fig. 1. When in place with the portions 5 of the hook in abutment with the wall, the portions 4 and 5 serve to support the shank 2 while the curved tine holds the hook against displacement so that it is capable of supporting great weight. The tine being half round in cross section or non-cylindrical as distinguished from cylindrical tends to prevent a turning of the hook.

It will be noted that the strip of material bent to provide the tine, shank and head provide a hook which is in the form of a spike which may be driven in the ordinary manner while the head which is formed by the superposed portions of the material is sufficiently rigid to withstand any blows necessary to drive the hook into place. Also it will be noted that the brace not only functions to support the shank when the hook is in place, but supports the hook against a bending tendency while the hook is being driven.

Having described the invention in the form at present preferred, what I claim and desire to secure by Letters Patent is:

A hook formed from strip metal comprising in combination, a driving head, upper shank and lower brace portions extending therefrom in a diverging relation, the end portions of the brace being bent towards said shank intermediate the ends thereof and having its extremity secured thereto, the said head consisting of at least four superposed contiguous portions of the strip provided by bending contiguous portions of the strip forwardly over said shank.

CHARLES L. WAID.